Sept. 6, 1960 H. E. WAYLAND 2,951,474
WIRE SAWS
Filed Jan. 27, 1958 2 Sheets-Sheet 1
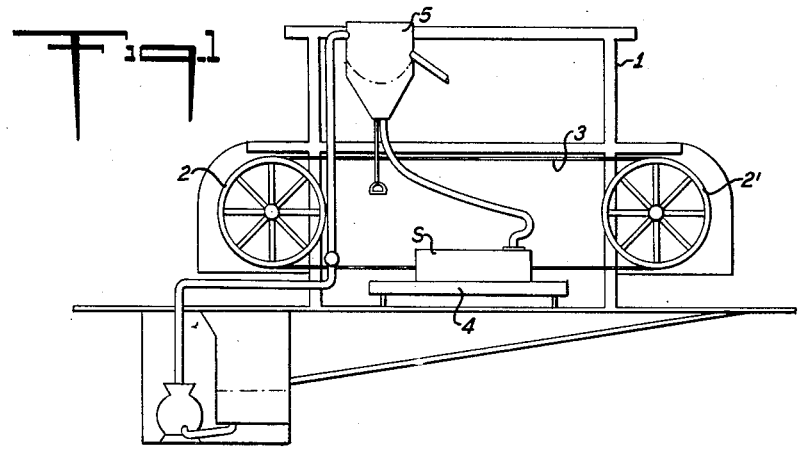
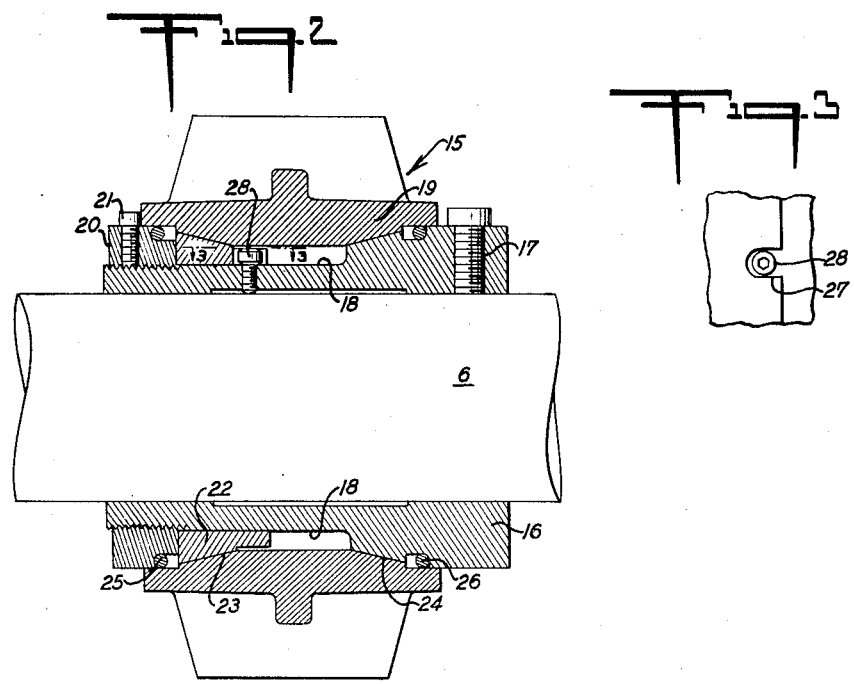
INVENTOR
HUBERT E. WAYLAND
BY
ATTORNEYS Sept. 6, 1960
H. E. WAYLAND
2,951,474
WIRE SAWS
Filed Jan. 27, 1958
2 Sheets-Sheet 2
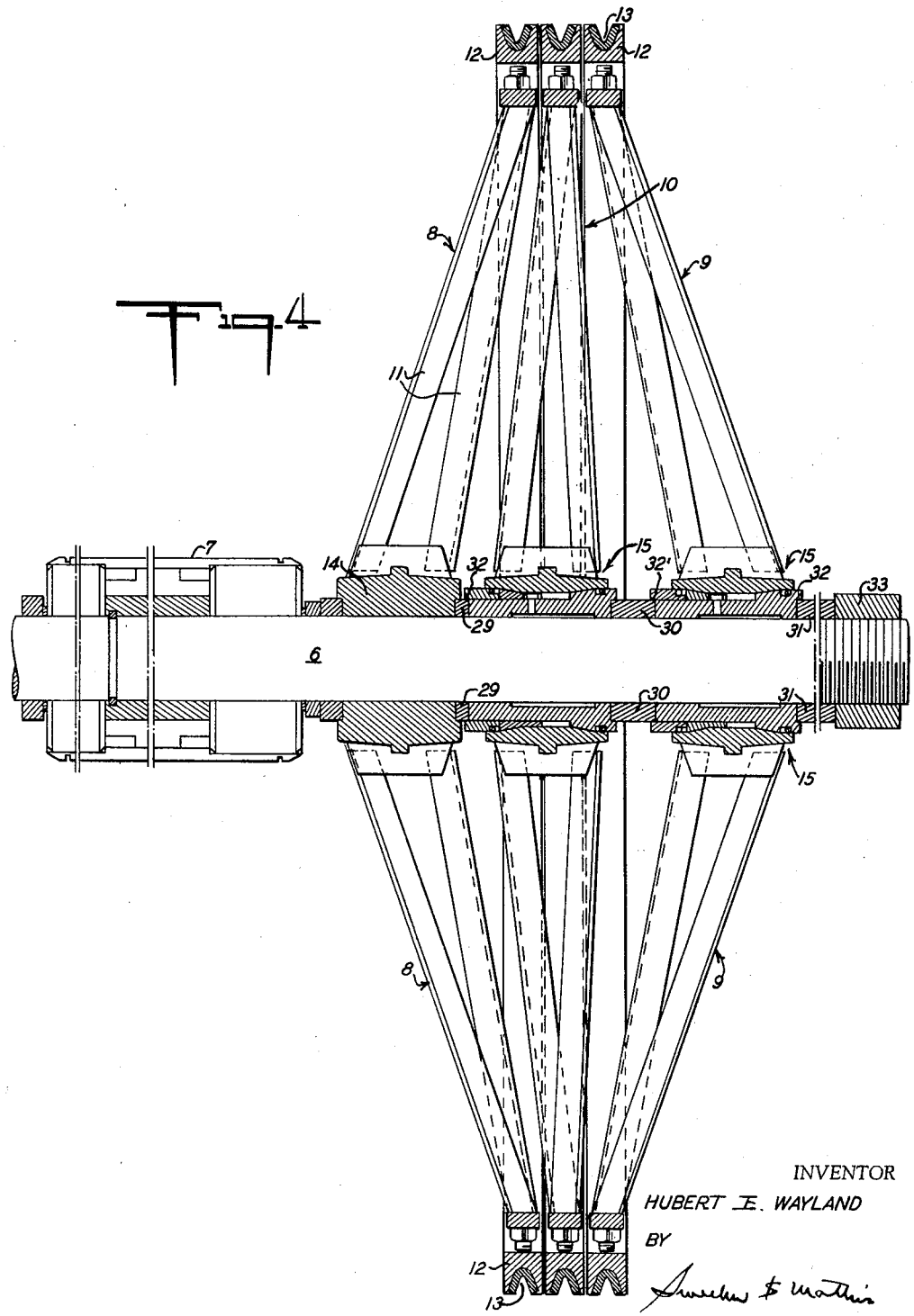
INVENTOR
HUBERT E. WAYLAND
BY
ATTORNEYS ың
United States Patent Office 2,951,474
Patented Sept. 6, 1960

2,951,474

WIRE SAWS

Hubert E. Wayland, Knoxville, Tenn., assignor to Ty-Saman Machine Company, Knoxville, Tenn., a corporation of Tennessee Filed Jan. 27, 1958, Ser. No. 711,492

8 Claims. (Cl. 125—12)

This invention relates to improvements in wire saws of the character used for cutting stone and other materials.

Wire saws used for this purpose are built with one or more wires operating over wheels arranged in spaced relation, for movement of the wires into bearing relation with a stone mounted between the wheels for creating an abrasive action on the stone due to the rectilinear movement of the wire with respect thereto, thereby sawing a kerf or groove in the stone. By means of a plurality of wires operating in parallel relation over wheels mounted side by side, it is possible to cut simultaneously a plurality of kerfs in a single block of stone. Inasmuch as the size of the cut pieces should be varied, according to requirements and according to the size of the block of stone, the wheels should be adjustable to vary the spacing between the wires.

These wires must be operated at relatively high speeds, and due to the friction with the block of stone, a considerable amount of power is needed to apply the required rectilinear movement to the wires. These wheels are provided with hubs mounted on supporting shafts. In an effort to minimize friction, it has been the practice heretofore to use roller bearings for mounting certain of the wheels on the supporting shaft. There must be a freedom for differential of rotating movement between the wheels mounted side-by-side on a single shaft, to allow for a difference in operation of the wires by reason of wearing of the grooves or otherwise.

The use of tapered roller bearings, as used heretofore, has presented difficult problems, due to the fact that the rollers have caused grooves to be formed in the bearing races which have prevented proper freedom of rotating movement of the wheels, looseness of operation and other objectionable characteristics. Moreover, there should be adequate provisions for holding the hubs in place on the supporting shaft and adjustable as to the spacing between the respective wheels, which has not been provided adequately heretofore.

One object of this invention is to overcome these objections encountered heretofore, to solve the problems long existing in these respects, and to improve the construction of wire saws of this type.

Another object of the invention is to improve the construction of wire saw wheels with reference particularly to the mounting thereof on the shaft and to provide a smoother running wheel at production speeds.

Still another object of the invention is to improve the hub structure of a wire saw wheel, to eliminate the peening or wear caused by tapered roller bearings due to differential in action of the several wheels mounted side-by-side and to permit the use of friction bearings which will allow smooth and uniform operation of the wheel.

A still further object of the invention is to provide for axial adjustment between the wheels mounted side-by-side on a supporting shaft for proper relative positioning of the wires and to take up for wear caused by the wires in the rim grooves of the wheels.

These objects may be accomplished, according to one embodiment of the invention by providing a plurality of wheels mounted in side-by-side relation on a supporting shaft for supporting the wire or wires that are applied to the rim grooves of the respective wheels. The idler wheels are spaced axially of the shaft and at least some of them are free for turning movement relative to the supporting shaft thereof. Provisions should be made for adjusting the hubs of these idler wheels axially of the shaft to take up for differences in spacing of the wires and for wear caused by the wires in the rim grooves of the wheels. Hub bushings are mounted on the shaft and are held spaced apart by sleeves that slip over the periphery of the shaft and are interposed between the hub bushings. By varying the width of these sleeves, the wheels can be spaced the proper and desired distances apart.

The tapered roller bearings used heretofore have been eliminated, and the difficulties encountered therewith also have been eliminated, by the use of friction bearings which will permit of differential turning movement of the wheels with respect to each other, and yet there will be no substantial wearing of the bearings in service.

This embodiment of the invention is illustrated in the accompanying drawings, in which:

Fig. 1 is a side elevation, somewhat diagrammatic, of a wire saw to which the invention may be applied;

Fig. 2 is a cross section through the wheel hub;

Fig. 3 is a detail cross section therethrough, on the line 3—3 in Fig. 2; and

Fig. 4 is a vertical section through a wheel assembly showing the mounting thereof on its supporting shaft.

The invention may be applied to any suitable or desirable form of wire saw machine, one form of which is shown diagrammatically in Fig. 1, wherein a supporting framework is illustrated generally by the numeral 1 and has a pair of driving and driven wheels 2 and 2' mounted on the framework at opposite ends thereof, with one or more wires 3 stretched between the wheels 2 and 2' and operated by the latter. The power means is not illustrated, but suitable provision is usually made for operating one of the wheels to provide appropriate feeding action for the rectilinear movement of the wires.

A block of stone is indicated at S, supported upon a car 4 or other suitable support located between the spaced wheels 2 and 2', in position for action of the wires on the block of stone to provide the desired cutting action. A suitable abrasive is usually supplied to facilitate the cutting operation from a cyclone separator or other source of supply, indicated generally at 5.

Each driven wheel assembly 2' may comprise one or more wheels mounted upon a supporting shaft 6, either in driving relation therewith or journaled relative thereto, as illustrated in Fig. 4, in a bearing generally indicated at 7. The shaft 6 projects outwardly from the bearing 7 and its outer end has no separate support therefor, but is free to receive the wheels that may be sleeved over said outer end in the manner illustrated in Fig. 4.

One such wheel assembly comprises three wheels arranged in side-by-side relation and mounted on the supporting shaft 6. This wheel assembly, indicated at 2', comprises an inner wheel, generally indicated at 8, an outer wheel 9 and an intermediate wheel 10. Any suitable number of wheels found desirable may be mounted in side-by-side relation on a single shaft 6, according to the requirements of the wire saw.

Each of the wheels 8—10 is constructed with a hub connected through a series of spokes 11 to a rim 12. The rim 12 is provided with a peripheral groove 13 for receiving the wire therein. Any suitable rim structure may be used, as desired, one form of which is set forth in my prior application for Wire Saws, filed January 14, 1958, Serial No. 708,787.

The wheel 8 has a hub 14 keyed or otherwise fixed rigidly to the supporting shaft 6 to rotate with the shaft. Each of the wheels 9 and 10 has a hub structure mounting the wheel on the shaft 6 for movement relative thereto and relative to each other. These hub structures of the wheels 9 and 10 are illustrated in Fig. 4, and more in detail in Fig. 2, and are designated generally by the numeral 15.

Each hub structure 15 includes a bushing 16 slidably inserted over the shaft 6 and slidable therealong for adjustment of the wheel with respect to the shaft. This bushing 16 is adjustably secured in place on the shaft by a set screw 17 threaded radially into engagement with the shaft. The bushing 16 has a reduced portion 18 at one end thereof.

The bushing 16 is surrounded by a hub ring 19 which is fitted thereover and is connected with the inner ends of the spokes 11. The hub ring 19 is held in place on the bushing 16 by a locking ring 20 which telescopes into one side edge of the hub ring 19 over the adjacent end of the bushing 16 and is locked to the latter by a set screw 21.

A bearing ring 22 is inserted inwardly of the hub ring 19 at the inner edge of the lock ring 20, being held in place by the latter. Tapered bearing surfaces are provided at 23 and 24, respectively, between the hub ring 19 and the bearing ring 22, and between the hub ring 19 and the bushing 16, providing friction bearing surfaces for the hub ring 19 upon the bushing and ring. The recessed space provided at 18 may be filled with lubricant, if desired, and this lubricant retained in place by rubber or elastic O-rings 25 and 26, which latter will also exclude dust and other contaminating materials from the interior of the friction surfaces.

The bearing ring 22 should be held against rotation relative to the bushing 16. I have provided a notch 27 in the inner edge of the bearing ring 22 within which a set screw 28 fits, being threaded into the periphery of the bushing 16, to hold the bearing ring against circumferential movement relative to the bushing.

It is often desirable to space the hub and hub assemblies different distances apart on the shaft 6. This is provided by means of sleeves 29, 30 and 31 that telescope over the shaft 6. The sleeve 29 is interposed between the hubs of the wheels 8 and 10, while the sleeve 30 is interposed between the hubs of the wheels 9 and 10. These sleeves 29 and 30 extend in axial alignment with the hub 14 and the hub bushing 16 of the next adjacent hub and between the hub bushings of the spaced wheels 9 and 10, preferably extending into recesses 32 and 32' in the adjacent hubs, for proper alignment of the parts.

The sleeve 31 is interposed between the outermost wheel 9 and the nut or collar 33 threaded on the outer end of the shaft 6. This sleeve 31 is usually of greater length than the other sleeves and may have bearing means connected therewith to hold the outer end of the shaft in place.

The sleeves or bushings 29, 30 and 31 are of different lengths, although they may be of equal length, if desired, according to the spacing required for the several wheels. These sleeves may be removed and others substituted of different lengths, for changing the spacing of the wheels when desired. These sleeves may be split longitudinally, if desired, for removal and replacement of sleeves of different lengths, without removing the wheels from the shaft. The recessed hubs keep the split bushings from coming out.

It is important for the proper operation of the wire saw that the wheels over which the wires are trained be free to move to accommodate for the travel of wires. If one or more of the grooves in the wheel rims should wear, the variation in the effect on the wires will cause a differential of turning movement of the wheels on a single shaft. The wheels rotate with the shaft 6, but due to this variation in travel of the wires, it is also necessary that there be a differential between the wheels 9 and 10 which is provided, according to this invention, by the friction bearing surfaces 23 and 24. The wheels do not turn on these friction surfaces, but the friction surfaces allow sufficient differential in circumferential travel of the wheels to accommodate for differences in wear of the wires or otherwise. At the same time, the wheels are maintained true, the bearings tight and the rotation uniform. It eliminates the difficulty that has long been experienced heretofore with anti-friction bearings, also simplifying the construction and operation and improving appreciably the wire saw wheels.

While the invention has been illustrated and described in one embodiment, it is recognized that variations and changes may be made therein without departing from the invention, as set forth in the claims.

I claim:

1. In a wire saw having a pair of driving and driven wheel assemblies spaced apart with wires extending over the wheel assemblies in positions for sawing action on material mounted therebetween, the driven wheel assembly comprising a plurality of wheels arranged in side-by-side relation, a supporting shaft for said wheels, each of the wheels having a hub structure mounting the wheel for turning movement with the shaft, the hub structure of one or more of said wheels including friction bearing surfaces externally of the shaft for causing a differential of circumferential turning movement of said wheel with respect to another of the wheels during the turning movement of said wheels with the shaft.

2. In a wire saw having a pair of driving and driven wheel assemblies spaced apart with wires extending over the wheel assemblies in positions for sawing action on material mounted therebetween, the driven wheel assembly comprising a plurality of wheels arranged in side-by-side relation, a supporting shaft for said wheels, each of the wheels including a hub structure mounting the wheel on the shaft for turning movement therewith, the hub structure for at least one of the wheels including a bushing mounted on the shaft, a hub ring surrounding the bushing, means confining the hub ring on the bushing, and means forming a friction surface between the hub ring and the bushing for relative turning movement between the hub ring and the bushing during rotation of said wheel with the shaft.

3. In a wire saw having a pair of driving and driven wheel assemblies spaced apart with wires extending over the wheel assemblies in positions for sawing action on material mounted therebetween, the driven wheel assembly comprising a plurality of wheels arranged in side-by-side relation, a supporting shaft for said wheels, each of the wheels including a hub structure mounting the wheel on the shaft for rotation therewith, the hub structure of at least one wheel including a bushing mounted on the shaft, a bearing ring sleeved over the bushing, a lock ring secured to the bushing for holding the bearing ring in place thereon, a hub ring surrounding the bushing and bearing ring, and means forming tapered friction surfaces between the hub ring and the bushing and bearing ring, respectively, for differential of movement of the hub ring with respect to the bushing during rotation of the wheel on the shaft.

4. In a wire saw having a pair of driving and driven wheel assemblies spaced apart with wires extending over the wheel assemblies in positions for sawing action on material mounted therebetween, the driven wheel assembly comprising a plurality of wheels arranged in side-by-side relation, a supporting shaft for said wheels, each of the wheels including a hub structure mounting the wheel on the shaft for rotation therewith, the hub structure of at least one wheel including a bushing mounted on the shaft, a bearing ring sleeved over the bushing, a lock ring secured to the bushing for holding the bearing ring in place thereon, a hub ring surrounding the bushing and bearing ring, means forming tapered friction surfaces between the hub ring and the bushing and bearing ring, respectively, for differential of movement of the hub ring with respect to the bushing during rotation of the wheel on the shaft, and means for locking the bearing ring against turning movement with respect to the bushing.

5. In a wire saw having a pair of driving and driven wheel assemblies spaced apart with wires extending over the wheel assemblies in positions for sawing action on material mounted therebetween, the driven wheel assembly comprising a plurality of wheels arranged in side-by-side relation, a supporting shaft for said wheels, each of the wheels including a hub structure for mounting the wheel on the shaft for turning movement therewith, and providing for differential turning movement between respective wheels.

6. In a wire saw having a pair of driving and driven wheels spaced apart with a wire extending over the wheels in positions for sawing action on material mounted therebetween, a supporting shaft for each wheel, the driven wheel comprising a hub structure including a bushing mounted on the shaft, a bearing ring sleeved over the bushing, a lock ring secured to the bushing for holding the bearing ring in place thereon, a hub ring surrounding the bushing and bearing ring, and means forming tapered friction surfaces between the hub ring and the bushing and bearing ring, respectively, for differential of movement of the hub ring with respect to the bushing during rotation of the wheel on the shaft.

7. In a wire saw having a pair of driving and driven wheel assemblies spaced apart with wires extending over the wheel assemblies in position for sawing action on material mounted therebetween, a supporting shaft for each wheel assembly, the driven wheel assembly comprising a plurality of wheels arranged in side-by-side relation, each of the wheels including a hub structure for mounting the wheel on the shaft thereof, the hub structure of at least one wheel including a bushing mounted on the shaft, a bearing ring sleeved over the bushing, means secured to the bushing for holding the bearing ring in place thereon, a hub ring surrounding the bushing and bearing ring, and means forming friction surfaces between the hub ring and the bushing and bearing ring, respectively, for differential of movement of the hub ring with respect to the bushing during rotation of the wheel on the shaft.

8. In a wire saw having a pair of driving and driven wheel assemblies spaced apart with wires extending over the wheel assemblies in position for sawing action on material mounted therebetween, a supporting shaft for each wheel assembly, the driven wheel assembly comprising a plurality of wheels arranged in side-by-side relation, each of the wheels including a hub structure for mounting the wheel on the shaft thereof, the hub structure of at least one wheel including a bushing mounted on the shaft, a hub ring surrounding the bushing, and means forming friction surfaces between the hub ring and the bushing, respectively, for differential of movement of the hub ring with respect to the bushing during rotation of the wheel on the shaft.

References Cited in the file of this patent

UNITED STATES PATENTS

| | | |
|---|---|---|
| 353,260 | Hinkley | Nov. 23, 1886 |
| 884,949 | Owens | Apr. 14, 1908 |
| 901,175 | Jones | Oct. 13, 1908 |
| 1,371,212 | Adams et al. | Mar. 15, 1921 |
| 2,841,020 | Van Deventer | July 1, 1958 |